(12) United States Patent
Wieclawski

(10) Patent No.: US 6,213,549 B1
(45) Date of Patent: Apr. 10, 2001

(54) SELF-FOLLOWING HEAD-RESTRAINT SYSTEM

(75) Inventor: Stanislaw Andrzej Wieclawski, Gross-Gerau (DE)

(73) Assignee: Lear Corporation

( * ) Notice: Subject to any disclaimer, the term of this patent is extended or adjusted under 35 U.S.C. 154(b) by 0 days.

(21) Appl. No.: 09/313,479

(22) Filed: May 17, 1999

(30) Foreign Application Priority Data

May 15, 1998 (DE) .......................................... 298 08 831 U

(51) Int. Cl.[7] .............................. B60N 2/42; A47C 3/025
(52) U.S. Cl. ................................ 297/216.13; 297/216.12; 297/354.11
(58) Field of Search ....................... 297/216.12, 216.13, 297/216.14, 354.11, 404

(56) References Cited

U.S. PATENT DOCUMENTS

| | | | |
|---|---|---|---|
| 2,973,029 | * | 2/1961 | Schollstein ...................... 297/216.12 |
| 3,215,468 | * | 11/1965 | Swenson et al. ............... 297/354.11 |
| 3,838,870 | * | 10/1974 | Hug .............................. 297/216.12 X |
| 4,784,352 | * | 11/1988 | Smith et al. ................. 297/216.13 X |
| 4,834,453 | * | 5/1989 | Makiol ........................ 297/354.11 X |
| 5,520,440 | * | 5/1996 | Lee .............................. 297/216.13 X |
| 5,884,968 | * | 3/1999 | Massara .......................... 297/216.12 |

FOREIGN PATENT DOCUMENTS

| | | | |
|---|---|---|---|
| 2232726 | * | 1/1974 | (DE) ............................... 297/216.12 |
| 2152202 | * | 11/1980 | (DE) ............................... 297/216.12 |

* cited by examiner

Primary Examiner—Peter M. Cuomo
Assistant Examiner—Rodney B. White
(74) Attorney, Agent, or Firm—Brooks & Kushman PC

(57) ABSTRACT

A seat and headrest arrangement for a vehicle comprising a backrest frame having an upper and a lower part which are connected to one another via a joint. The arrangement also includes a headrest being mounted at the upper part and a spring means biasing the upper part and the headrest into a rest position. The arrangement is characterized in that the upper part can be pivoted backwardly from its rest position.

7 Claims, 2 Drawing Sheets

SELF-FOLLOWING HEAD-RESTRAINT SYSTEM

Figure 1:
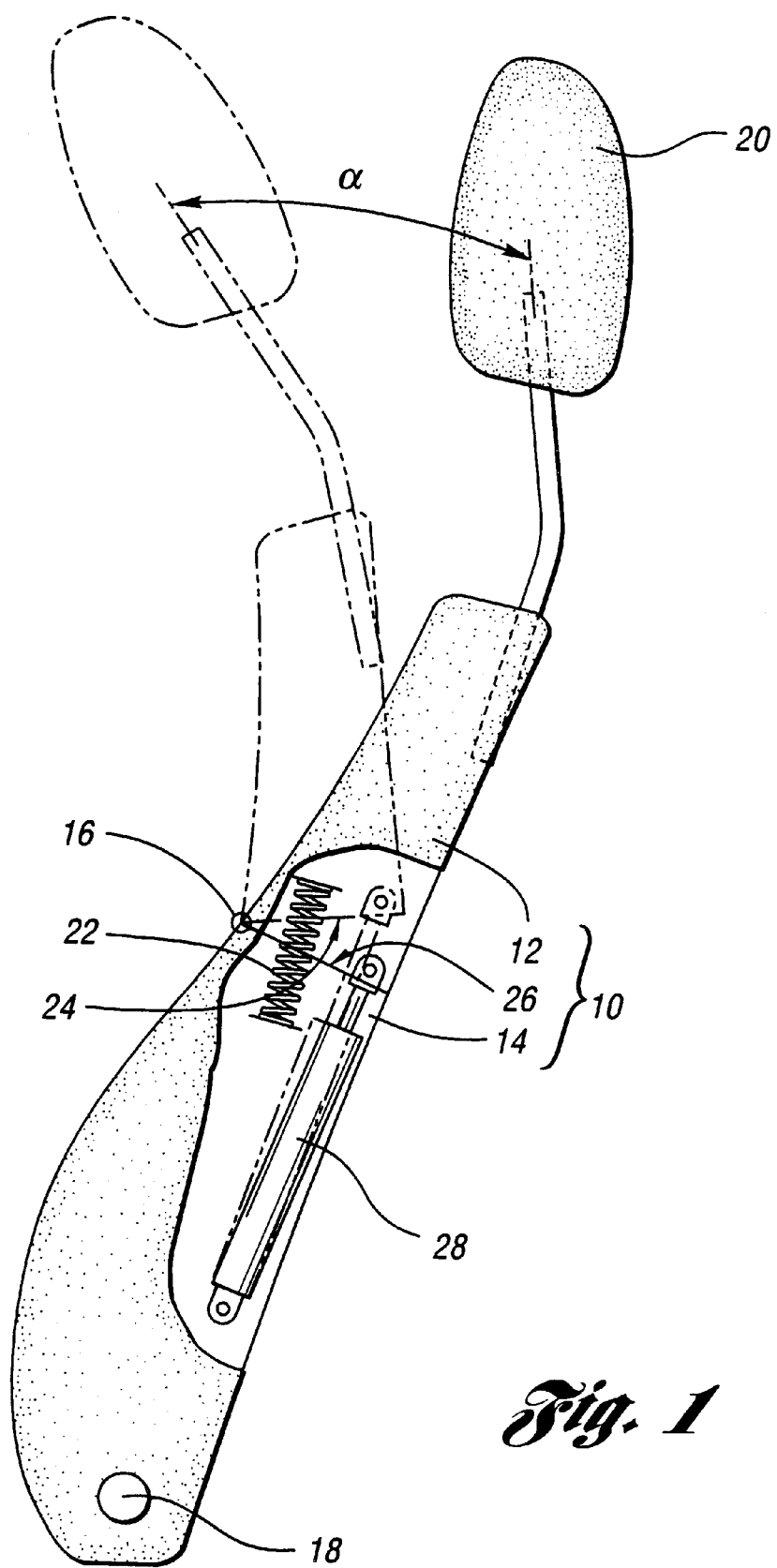

The present invention relates to a seat and headrest arrangement for a vehicle comprising a backrest frame having an upper and a lower part which are connected to one another via a joint, with a headrest being mounted at the upper part and with a spring means biasing the upper part and the headrest into a rest position (cf. DE 197 43 339).

Conventional vehicle seats usually consist of a seat frame and a backrest frame which is pivotally connected thereto and which can be adjusted in its inclination with respect to the seat frame in order to enable an adaptation to the anatomy and to the individual requirements of the vehicle passengers. In these conventional arrangements there exists the basic problem that the distance between the head of the vehicle passenger and the headrest which is mounted on the backrest frame varies in dependence on the inclination of the backrest frame. Therefore the distance between the back of the head of the vehicle passenger and the headrest can be determined in conventional vehicle seats for one theoretical seat position only. This however represents a compromise between safety and comfort since the theoretically safest position with a completely upright backrest is uncomfortable and the most comfortable seat position with a completely inclined backrest offers the least protection, since the distance between the headrest and the back of the head of the vehicle passenger is a maximum in this case.

Moreover, a vehicle passenger often assumes different sitting positions during travel even with a constant backrest inclination, so that here as well a constant distance between the head of the passenger and the headrest is not always ensured. In particular passengers who incline their upper torso relatively far forwards during travel are subject to an increased risk of injury to the neck in the event of an impact, in particular a rear impact.

The object of the present invention is to provide a seat and headrest arrangement of the initially named kind in which a risk of injury to the neck and cervix region of a vehicle passenger is minimised.

This object is satisfied by the features of claim 1 and in particular in that the upper part can be pivoted backwardly from a rest position.

In accordance with the invention the upper part is biased by the spring means into a forward rest position or forward final position, so that the upper part can be pivoted backwardly against the force of the spring. Through this the upper part can, on the one hand, be pushed backwards by the shoulder region of the vehicle passenger; on the other hand, the upper part always moves automatically in the direction of the rest position which is furthest forward so that a constant distance between the headrest and the head of the vehicle passenger is always present. Thus a constant distance is always present between the backrest and the head of the vehicle passenger during travel and independently of the position of the backrest so that the construction can be optimised as a whole. As soon as the vehicle passenger moves forwards or backwards with his upper torso, the upper part follows this movement so that the critical distance between the head and the headrest does not change.

Advantageous embodiments of the invention are described in the description, in the drawings and in the subordinate claims.

In accordance with a first advantageous embodiment the upper and the lower part can each have an abutment surface, with the abutment surfaces being in engagement with one another when the upper part is in its rearmost position. In this it is also advantageous if the abutment surfaces are located in the region of the joints.

In accordance with a further advantageous embodiment a shock absorber is provided which is mounted between the upper and the lower part. Through this a rapid, backwardly directed pivotal movement is damped, i.e. a resistance is offered to the head and shoulder region of the passenger so that an excessive acceleration of the head is avoided. In this it can be particularly advantageous if the resistance of the shock absorber increases proportionally to the impact speed. Through this the upper part can be pivoted slightly by the head or the shoulder of the vehicle passenger respectively at a slow speed of movement. In the event of an accident however the shock absorber is pressed together at a high speed by the impact of the shoulder or of the head respectively onto the upper part, through which its resistance increases so that energy is dissipated in the shock absorber.

In accordance with a further advantageous embodiment the spring means can be mounted between the upper part and the lower part and preferably push the upper part forwards, i.e. in the direction of the back of the vehicle passenger, in the rest position.

In accordance with a further advantageous embodiment the upper part has a support surface for the back or the shoulder region of the vehicle passenger respectively above the joint so that the upper part can be pivoted by the pressure exerted by the vehicle passenger.

In the following the present invention will be described in a purely exemplary manner with reference to an advantageous embodiment and with reference to the accompanying drawings. Shown are FIG. 1 a highly simplified side view of a seat and headrest arrangement in accordance with the invention; and FIG. 2 the side view of FIG. 1, with the backrest frame being covered by a cushioning.

FIG. 1 shows in a highly simplified illustration the side view of a seat and headrest arrangement in accordance with the invention for a vehicle, having a backrest frame 10 which consists of an upper part 12 and a lower part 14 which are articulatedly connected to one another via a joint 16. Both the upper part 12 and the lower part 14 are designed as a frame and provided with a non-illustrated cushioning. The lower part 14 is rotatably connected in the conventional manner to a (non-illustrated) seat frame and can be pivoted with respect to the latter via a joint 18.

As shown in FIG. 1 the backrest frame 10 is designed as a divided frame, with the joint 16 being provided in the region of the division which connects the upper part 12 and the lower part 14 pivotally to one another. In this the lower part 14 extends over approximately 60% and the upper part 12 extends over approximately 40% of the total height of the backrest frame 10. The joint is located on that side of the backrest frame 10 which faces the vehicle passenger so that the upper part 12 can be pivoted through the angle a, as is illustrated in FIG. 1. At the same time the headrest 20, which is secured to the upper part 12 via two bars and which is mounted in the conventional manner, i.e. adjustable in height and inclination, is therein pivoted along with it.

A compression spring 22, which is arranged between the lower part 14 and the upper part 12, biases the upper part 12 into its (in FIG. 1, left) rest position, from which it can be pivoted backwardly, i.e. to the right in FIG. 1. Through the exertion of a pressure on the side of the upper part 12 of the backrest frame 10 which faces the vehicle passenger the upper part 12 can be pivoted backwardly together with the headrest 20 until an abutment surface 24 of the upper part 12 and an abutment surface 26 of the lower part 14 lie one upon the other. In this position the backrest frame 10 has the appearance of conventional constructions.

As is further shown in FIG. 1, a shock absorber 28 is articulatedly fastened at the rear side of the backrest frame 10 between the upper part 12 and the lower part 14 so that the shock absorber 28 is pressed together into its rear final position when the upper part 12 is moved out of its rest position (i.e. its forward final position).

Figure 2:
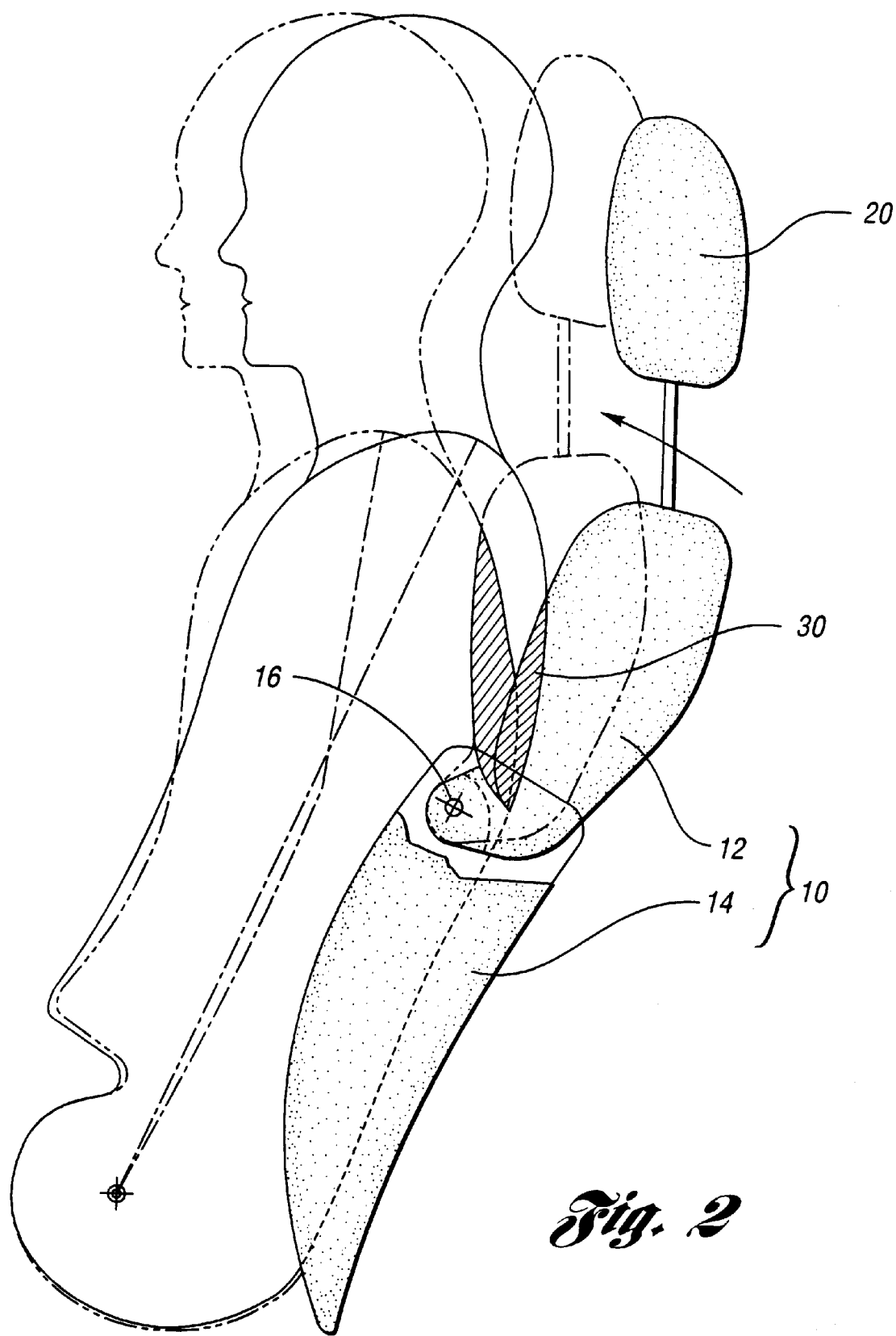

FIG. 2 shows a further side view of the seat and headrest arrangement in accordance with the invention, with the upper part 12 and the lower part 14 of the backrest frame 10 being provided however with a cushioning. As can be recognised, the upper part 12 has a support surface 30 for the back or the shoulder region of the vehicle passenger respectively above the joint 16. In the region of this support surface 30, which is illustrated with hatching in FIG. 2, the vehicle passenger presses with his rear upper torso against the upper part 12 so that the latter is pivoted backwardly against the force of the spring 22 about the joint 16. As soon, however, as the vehicle passenger bends forward, or in the event that the lower part 14 is set at a lesser inclination, the upper part 12 moves in the arrow direction so that the distance between the back of the head of the vehicle passenger and the headrest 20 remains constant.

The method of functioning of the embodiment illustrated in FIGS. 1 and 2 is as follows.

Fundamentally, the headrest 20, which is connected to the upper part 12, moves together with the latter about the joint 16. The rest position of the part 12 is the position illustrated with hatching in FIGS. 1 and 2 in which the upper part 12 is tilted about the joint 16 with respect to the lower part 14. Thus if no vehicle passenger is present on the seat, then the headrest 20 assumes its most forward position as a result of the spring force of the spring 22.

The rear final position of the upper part 12 is determined by the two abutment surfaces 24 and 26 (FIG. 1). This rear final position corresponds to the normal travelling position for which the vehicle seat is designed.

The movement of the upper part 12 is fundamentally determined by the shock absorber 28, which at normal forces and speeds enables a free movement of the headrest 20 or of the upper part 12 respectively. During a vehicle accident in which first the upper torso and subsequently the head of the vehicle passenger is pressed with high speed into the seat, the resistance of the shock absorber increases, however, so that in a pressure exerted on the support surface 30 of the upper part 12 by the back of the vehicle passenger the headrest 20 is moved only slowly in the rear direction, through which neck and cervix injuries are minimised.

As shown in FIG. 2, in the region of the support surface 30 the rear upper torso of the vehicle passenger fundamentally presses against the upper part 12 so that the latter is pivoted backwardly against the force of the spring 22. As soon, however, as the vehicle passenger changes the position of his upper torso (for example as a result of an accident) the upper part 12 follows this movement and pivots in the arrow direction (FIG. 2) about the joint 16 until a contact between the body of the vehicle passenger and the support surface 30 of the upper part 12 again takes place. In the event of an impact, however, the rear upper torso region of the vehicle passenger presses against the support surface 30 of the upper part 12 at high speed, through which the shock absorber 28 (FIG. 1) increases its resistance, so that in this case energy is dissipated in the pivoting of the upper part 12 about the joint 16. The arrangement in accordance with the invention also provides an increased passenger comfort, since the backrest frame 10 automatically adapts to the respective seat position of the vehicle passenger substantially independently of the inclination of the backrest.

| List of reference numerals | |
| --- | --- |
| 10 | backrest frame |
| 12 | upper part |
| 14 | lower part |
| 16 | joint |
| 18 | joint |
| 20 | headrest |
| 22 | spring |
| 24, 26 | abutment surface |
| 28 | shock absorber |
| 30 | support surface |

What is claimed is:

1. Seat and headrest arrangement for a vehicle comprising a backrest frame (10) having an upper (12) and a lower part (14) which are connected to one another via a joint (16), with a headrest (20) being mounted at the upper part (12) and with a spring means (22) biasing the upper part (12) and the headrest (20) into a rest position, characterised in that the upper part (12) pivotable backwardly from its rest position.

2. Arrangement in accordance with claim 1, characterised in that the upper and the lower part (12, 14) each comprise an abutment surface (24, 26), with the abutment surfaces being in engagement with one another when the upper part (12) is in its rearmost position.

3. Arrangement in accordance with claim 2, characterized in that the abutment surfaces (24, 26) are provided near the joint (16).

4. Arrangement in accordance with claim 1, characterised in that a shock absorber (28) is provided which is mounted between the upper (12) and the lower part (14).

5. Arrangement in accordance claim 4, characterised in that the resistance of the shock absorber (28) increases proportionally to the impact speed.

6. Arrangement in accordance with claim 1, characterized in that the spring means (22) is mounted between the upper part (12) and the lower part (14) and pushes the upper part (12) forward into the rest position.

7. Arrangement in accordance with claim 1, characterised in that the upper part (12) has a support surface (30) for the back or the shoulder region of the vehicle passenger respectively above the joint (16).

* * * * *